US012564809B2

(12) United States Patent
Bae et al.

(10) Patent No.: US 12,564,809 B2
(45) Date of Patent: Mar. 3, 2026

(54) AIR PURIFIER

(71) Applicant: COWAY Co., Ltd., Gongju-si (KR)

(72) Inventors: Jun Hyoung Bae, Gongju-si (KR); Yu Young Nam, Gongju-si (KR); Ki Soo Kim, Gongju-si (KR); Jae Hong Kim, Gongju-si (KR)

(73) Assignee: COWAY Co., Ltd., Gongju-si (KR)

( * ) Notice: Subject to any disclaimer, the term of this patent is extended or adjusted under 35 U.S.C. 154(b) by 347 days.

(21) Appl. No.: 18/554,385

(22) PCT Filed: Apr. 12, 2022

(86) PCT No.: PCT/KR2022/005275
§ 371 (c)(1),
(2) Date: Oct. 6, 2023

(87) PCT Pub. No.: WO2022/220540
PCT Pub. Date: Oct. 20, 2022

(65) Prior Publication Data
US 2024/0189751 A1     Jun. 13, 2024

(30) Foreign Application Priority Data
Apr. 14, 2021     (KR) ........................ 10-2021-0048700

(51) Int. Cl.
B01D 46/00          (2022.01)
F24F 8/108          (2021.01)
(Continued)

(52) U.S. Cl.
CPC ..... B01D 46/0006 (2013.01); B01D 46/0049 (2013.01); F24F 8/108 (2021.01);
(Continued)

(58) Field of Classification Search
CPC ............ B01D 46/0005; B01D 46/0006; B01D 2265/025; B01D 2265/028;
(Continued)

(56) References Cited

U.S. PATENT DOCUMENTS 5,030,264 A * 7/1991 Klotz ................... F02M 35/024
55/502

FOREIGN PATENT DOCUMENTS

CN          104740946 A     7/2015
CN          205137712 U     4/2016
(Continued)

OTHER PUBLICATIONS

Machine translation of CN 205137712 (Year: 2016).*
International Search Report Issued Jul. 22, 2022, in PCT/KR2022/005275, filed on Apr. 12, 2022, 2 pages.

*Primary Examiner* — Robert Clemente
(74) *Attorney, Agent, or Firm* — Oblon, McClelland, Maier & Neustadt, L.L.P.

(57)          ABSTRACT

The present disclosure relates to an air purifier and, more particularly, to an air purifier capable of introducing a filter support structure including a first body supporting a filter member and having a protruding part on a lower surface thereof, and a second body disposed at a lower portion of the first body and having a groove part having an inclined surface in contact with the protruding part formed at one side thereof, thereby allowing the filter member drawn out of the housing to be inserted into an inner space of the housing and simultaneously moving the filter member upward to form a sealing against a latching part, thereby enhancing convenience of filter management and improving air tightness of the filter member.

15 Claims, 13 Drawing Sheets

(51) Int. Cl.
   F24F 8/80          (2021.01)
   F24F 13/28         (2006.01)
(52) U.S. Cl.
   CPC .............. F24F 8/80 (2021.01); F24F 13/28
          (2013.01); B01D 2265/025 (2013.01); B01D
          2265/028 (2013.01); B01D 2273/30 (2013.01)
(58) Field of Classification Search
   CPC . B01D 46/0049; B01D 2273/30; F24F 8/108;
                              F24F 8/80; F24F 13/28
   See application file for complete search history.

(56)                References Cited

FOREIGN PATENT DOCUMENTS

| | | | |
|---|---|---|---|
| DE | 10 2019 201 993 | A1 | 8/2020 |
| JP | 8-121272 | A | 5/1996 |
| KR | 101530186 | B1 * | 6/2015 |
| KR | 10-2015-0126328 | A | 11/2015 |
| KR | 10-2020-0097574 | A | 8/2020 |
| KR | 10-2020-0133889 | A | 12/2020 |
| KR | 20-0492808 | Y1 | 12/2020 |

* cited by examiner

AIR PURIFIER

CROSS-REFERENCE TO RELATED APPLICATIONS

This application is a National Stage entry under 35 U.S.C. § 371 of PCT/KR2022/005275, filed on Apr. 12, 2022, and claims priority to Korean Patent Application No. 10-2021-0048700, filed on Apr. 14, 2021, the entire contents of which are incorporated herein by reference.

FIELD

The present disclosure relates to an air purifier and, more particularly, to an air purifier capable of introducing a filter support structure including a first body supporting a filter member and having a protruding part on a lower surface thereof, and a second body disposed at a lower portion of the first body and having a groove part having an inclined surface in contact with the protruding part formed at one side thereof, thereby allowing the filter member drawn out of the housing to be inserted into an inner space of the housing and simultaneously moving the filter member upward to form a sealing against a latching part, thereby enhancing convenience of filter management and improving air tightness of the filter member.

BACKGROUND

The air purifier is a device that forcibly inhales and purifies polluted external air, and then discharges the purified filtered air to the outside. The air purifier includes a blower for introducing external air into the air purifier and a filter member having a function of filtering foreign substances such as dust or bacteria in the air. The known air purifier is configured to forcibly suck polluted air in an indoor space such as a home or an office, collect and filter the polluted air, and then recirculate and supply the purified air to the indoor space.

In the air purifier disclosed in Korean Patent Laid-Open Publication No 2015-0126328 by COWAY, a filter unit including a plurality of filters such as a pre-filter, a pre-processing filter, a functional filter, a HEPA filter, and a deodorizing member is mounted in a filter accommodation part of a body. In this case, since it is structurally impossible to mechanically withdraw the filter unit itself, a user must manually grip the filter unit with both hands in order to draw out the filter unit from the filter accommodating part, thereby having a disadvantage in hygiene. Further, even if only some filters are required to be replaced, such as the HEPA filter, the entire filter unit has to be separated from the outside of the filter accommodation part.

An air purifier capable of easily replacing a filter disclosed in Korean Patent Registration No. 2020-0097574 of BODYFRIEND partially discloses that when a user presses the button link member exposed to the outside, a filter push member pressures the airtight part of the filter member laterally by power transmitted therefrom, thereby exposing the filter member to the outside of the case member. However, at this time, since the filter push member applies pressure in a lateral direction to the filter member, the filter member is in a somewhat unstable state inclined in a direction opposite to a portion to be pressurized when exposed to the outside of the case member, and since there is no member applying pressure in a direction perpendicular to the ground with respect to the filter member when operating the air purifier, the airtight state of the filter member cannot be effectively maintained.

SUMMARY

In order to solve the above problems, an air purifier according to the present disclosure has been made in an effort to introduce a filter support structure including a first body supporting a filter member and having a protruding part on a lower surface thereof, and a second body disposed at a lower portion of the first body and having a groove part having an inclined surface in contact with the protruding part formed at one side thereof, thereby allowing the filter member drawn out of the housing to be inserted into an inner space of the housing and simultaneously moving the filter member upward to form a sealing against a latching part, thereby improving convenience of filter management and improving air tightness of the filter member.

An air purifier according to the embodiment of the present disclosure aims to include an inclined surface corresponding to an inclined surface of a groove part provided in the second body on one side of a protruding part provided in the first body, thereby improving stability of the filter member when the first body moves upward or downward.

An air purifier according to an embodiment of the present disclosure aims to include a plurality of groove parts of the second body formed along opposing sides of the ' ⊂ ', and a plurality of protruding parts of the first body formed to correspond to the groove parts, thereby dispersing a load of the first body with respect to the second body, thereby improving stability of the filter member when the first body moves upward or downward.

An air purifier according to an embodiment of the present disclosure aims to include a coupling part passing through the second body and positioned above the second body when the coupling part of the third body is coupled to the mounting part of the first body, thereby enabling the first body coupling with the third body through the mounting structure of the first body already provided, thereby improving efficiency of design.

An air purifier according to the embodiment of the present disclosure aims to include an inclined surface formed on a pull-out direction side of the groove part of the second body and an engaging surface formed on a pull-in direction side, so that the movement of the protruding part of the first body in the pull-in direction is restricted at the release position where the filter member can be detached and the first body and the second body are drawn out together in one body when the second body is withdrawn in the pull-out direction, thereby improving user manipulation convenience.

An air purifier according to an embodiment of the present disclosure aims to include a third body disposed at a lower portion of the second body and having a coupling part coupled to the mounting part of the first body, and thus improves stability during movement of the filter member by coupling the first body to the third body and pulling out the first body and the third body integrally when the second body is withdrawn in the pull-out direction.

An air purifier according to an embodiment of the present disclosure aims to include a protruding structure corresponding to the shape of the filter member, and the coupling part of the third body is formed to correspond to the shape of the mounting part, thereby improving a coupling force between the first body and the third body.

An air purifier according to the embodiment of the present disclosure aims to include a pressing stopper temporarily pressing a portion of the second body on one side of the third body, so that the second body can be drawn out only when an external force is applied, thereby preventing the filter member from being unexpectedly moved in a vertical direction in a lock position.

An air purifier according to the embodiment of the present disclosure aims to include a support part formed to protrude in a direction of the ground to support the load of the filter support structure on one side of the third body, thereby preventing separation or damage of the filter support structure during withdrawal and improving the stability of the filter support structure.

An air purifier according to an embodiment of the present disclosure aims to include a locking part that temporarily limits relative movement of the second body with respect to the first body before the filter support structure is fully inserted into the housing, thereby allowing the filter member to move upward or downward only at a predetermined position.

An air purifier according to an embodiment of the present disclosure aims to introduce the locking part including a locking groove and an elastic stopper protruding from a third body and descending toward the lock groove, thereby providing an accuracy of control related to the locking part.

An air purifier according to an embodiment of the present disclosure aims to achieve a smooth ascending or descending of the elastic stopper without stopping by forming an inclined surface on one side of the locking groove included in the locking part.

An air purifier according to an embodiment of the present disclosure aims to include a guide part coupled to the elastic stopper at one side of the fourth body and guiding the elastic stopper to ascend or descend, thereby improving the accuracy and stability of the operation of the locking part.

An air purifier according to an embodiment of the present disclosure aims to include a frame part surrounding at least a portion of an outer rim of a first body, and thus improves stability of the filter member by guiding the ascending or descending of the first body.

In order to achieve the above objects, an air purifier according to the present disclosure may include: a housing having at least a portion of one side surface openable; a filter member disposed in the housing and for filtering external air; a latching part disposed at an upper side of the filter member in the housing, wherein at least a portion of the latching part have a shape corresponding to an upper end of the filter member and is formed to be in contact with the upper end of the filter member; and a filter support structure on which the filter member is seated, and which, in a state where one side surface of the housing is open, can be drawn out of the housing along a pull-out direction in a direction of the one side surface, wherein the filter support structure comprises: a first body having a mounting part on which filter member is seated, and having a protruding part protruding and extending in a direction of the ground on a lower surface thereof; and a second body disposed at a lower portion of the first body, and having a groove part formed on one side thereof with an inclined surface of a straight line or a curved line in contact with the protruding part, wherein the protruding part moves upward along the inclined surface of the groove part when the second body is drawn in a pull-in direction opposite to the pull-out direction, the first body moves from a release position, which is a position where the filter member is detachable, to a lock position, which is position at an upper side of the release position and a position where the filter member is in contact with the latching part and fixed thereto, and in the lock position, air flow between the filter member and the latching part is blocked.

In an air purifier according to an embodiment of the present disclosure, an inclined portion corresponding to the inclined surface of the groove part may be formed on one side of the protruding part.

In an air purifier according to an embodiment of the present disclosure, the second body may be formed in a shape of ' ⊂ ', the groove part is formed in plurality along opposite sides of the ' ⊂ ', and the protruding part of the first body is formed in plurality to correspond to the plurality of groove parts.

In an air purifier according to an embodiment of the present disclosure, the filter support structure may include: a third body of which at least a portion is disposed at a lower portion of the second body to support the second body, wherein the second body is formed in a shape of ' ⊂ ', the third body has a coupling part coupled to the mounting part, and the coupling part passes through the second body when the coupling part is coupled to the mounting part and is positioned above the second body.

In an air purifier according to an embodiment of the present disclosure, when the second body is withdrawn in the pull-out direction, the protruding part may move downward along the inclined surface of the groove part, and the first body may move from the lock position to the release position.

In an air purifier according to an embodiment of the present disclosure, the inclined surface of the second body may be formed on the pull-out direction side of the groove part, and an engaging surface may be formed on the pull-in direction side of the groove part, the protruding part may be in contact with the engaging surface to limit movement in the pull-in direction at the release position, and the first body may be drawn together with the second body when the second body is withdrawn in the pull-out direction.

In an air purifier according to an embodiment of the present disclosure, the filter support structure may include: a third body of which at least a portion is disposed at a lower portion of the second body to support the second body, wherein the third body has a coupling part coupled to the mounting part, and the third body is drawn together with the second body when the second body is withdrawn in the pull-out direction.

In the air purifier according to the embodiment of the present disclosure, the mounting part of the first body may have a circular or rectangular protruding structure corresponding to a shape of the filter member, and the coupling part of the third body may be formed in a shape corresponding to the mounting part.

In the air purifier according to the embodiment of the present disclosure, a pressing stopper temporarily pressing a portion of the second body may be provided at one side of the third body to limit free movement of the second body.

In the air purifier according to the embodiment of the present disclosure, the third body may include a support part protruding from one side thereof in the direction of the ground to support a load of the filter support structure in contact with the ground when the filter support structure is withdrawn.

In the air purifier according to the embodiment of the present disclosure, the filter support structure may include: a locking part temporarily limiting a relative movement of the second body before the filter support structure is fully inserted into the housing so that the first body can move upward by the relative movement of the second body only after the third body is fully inserted into the housing when the filter support structure is drawn.

In the air purifier according to the embodiment of the present disclosure, the locking part may include: a locking opening formed on one side of the third body; a locking groove formed at one side of the inside of the housing and formed at a position opposite to the locking opening when the filter support structure is fully inserted into the housing; and an elastic stopper protruding toward a lower side of the third body through the locking opening and having a spring therein to be lowed toward the locking groove when the elastic stopper is positioned above the locking groove, thereby fixing the third body to the housing, and wherein the elastic stopper is lifted to limit the relative movement of the second body when the elastic stopper is positioned at a position other than the locking groove.

In the air purifier according to the embodiment of the present disclosure, an inclined surface may be formed in one side of the locking groove so that the elastic stopper can be lifted without stopping locked when the third body moves.

In the air purifier according to the embodiment of the present disclosure, the filter support structure may further include: a fourth body coupled to the third body to move integrally with the third body and covering at least a portion of the second body, wherein the fourth body comprises a guide part coupled to the elastic stopper at one side thereof to guide the elastic stopper to ascend or descend.

In the air purifier according to the embodiment of the present disclosure, the fourth body may include a frame part surrounding at least a portion of an outer rim of the first body.

According to the above configuration, the air purifier according to the present disclosure introduces a filter support structure including a first body supporting a filter member and having a protruding part on a lower surface thereof, and a second body disposed at a lower portion of the first body and having a groove part having an inclined surface in contact with the protruding part formed at one side thereof, thereby allowing the filter member drawn out of the housing to be inserted into an inner space of the housing and simultaneously moving the filter member upward to form a sealing against a latching part, thereby improving convenience of filter management and improving air tightness of the filter member. That is, since the insertion and sealing of the filter member are performed in a series of continuous operations, the filter member can be easily detached from the air purifier by the user.

According to an embodiment of the present disclosure, the air purifier includes an inclined surface corresponding to an inclined surface of a groove part provided in the second body on one side of a protruding part provided in the first body, so that the air purifier provides an effect of improving stability of the filter member when the first body moves upward or downward.

According to an embodiment of the present disclosure, the air purifier includes a plurality of groove parts of the second body formed along opposing sides of the '⊂', and a plurality of protruding parts of the first body formed to correspond to the groove parts, thereby dispersing a load of the first body with respect to the second body, so that the air purifier provides an effect of improving stability of the filter member when the first body moves upward or downward.

According to an embodiment of the present disclosure, the air purifier includes a coupling part passing through the second body and positioned above the second body when the coupling part of the third body is coupled to the mounting part of the first body, so that the air purifier provides an effect of enabling the first body coupling with the third body through the mounting structure of the first body already provided, thereby improving efficiency of design.

According to the embodiment of the present disclosure, the air purifier includes an inclined surface formed on a pull-out direction side of the groove part of the second body and an engaging surface formed on a pull-in direction side, so that the movement of the protruding part of the first body in the pull-in direction is restricted at the release position where the filter member can be detached and the first body and the second body are drawn out together in one body when the second body is withdrawn in the pull-out direction, so that the air purifier provides an effect of improving user manipulation convenience.

According to an embodiment of the present disclosure, the air purifier includes a third body disposed at a lower portion of the second body and having a coupling part coupled to the mounting part of the first body, so that the air purifier provides an effect of improving stability during movement of the filter member by coupling the first body to the third body and pulling out the first body and the third body integrally when the second body is withdrawn in the pull-out direction.

According to an embodiment of the present disclosure, the air purifier includes a protruding structure corresponding to the shape of the filter member, and the coupling part of the third body is formed to correspond to the shape of the mounting part, so that the air purifier provides an effect of improving a coupling force between the first body and the third body.

According to the embodiment of the present disclosure, the air purifier includes a pressing stopper temporarily pressing a portion of the second body on one side of the third body, so that the second body can be drawn out only when an external force is applied, so that the air purifier provides an effect of preventing the filter member from being unexpectedly moved in a vertical direction in a lock position.

According to the embodiment of the present disclosure, the air purifier includes a support part formed to protrude in a direction of the ground to support the load of the filter support structure on one side of the third body, so that the air purifier provides an effect of preventing separation or damage of the filter support structure during withdrawal and improving the stability of the filter support structure.

According to an embodiment of the present disclosure, the air purifier includes a locking part that temporarily limits relative movement of the second body with respect to the first body before the filter support structure is fully inserted into the housing, so that the air purifier provides an effect of allowing the filter member to move upward or downward only at a predetermined position.

According to an embodiment of the present disclosure, the air purifier introduces the locking part including a locking groove and an elastic stopper protruding from a third body and descending toward the lock groove, so that the air purifier provides an effect of providing an accuracy of control related to the locking part.

According to an embodiment of the present disclosure, the air purifier provides an effect of achieving a smooth ascending or descending of the elastic stopper without stopping by forming an inclined surface on one side of the locking groove included in the locking part.

According to an embodiment of the present disclosure, the air purifier includes a guide part coupled to the elastic stopper at one side of the fourth body and guiding the elastic stopper to ascend or descend, so that the air purifier provides an effect of improving the accuracy and stability of the operation of the locking part.

According to an embodiment of the present disclosure, the air purifier includes a frame part surrounding at least a portion of an outer rim of a first body, so that the air purifier provides an effect of improving stability of the filter member by guiding the ascending or descending of the first body.

DETAILED DESCRIPTION

Figure 1:
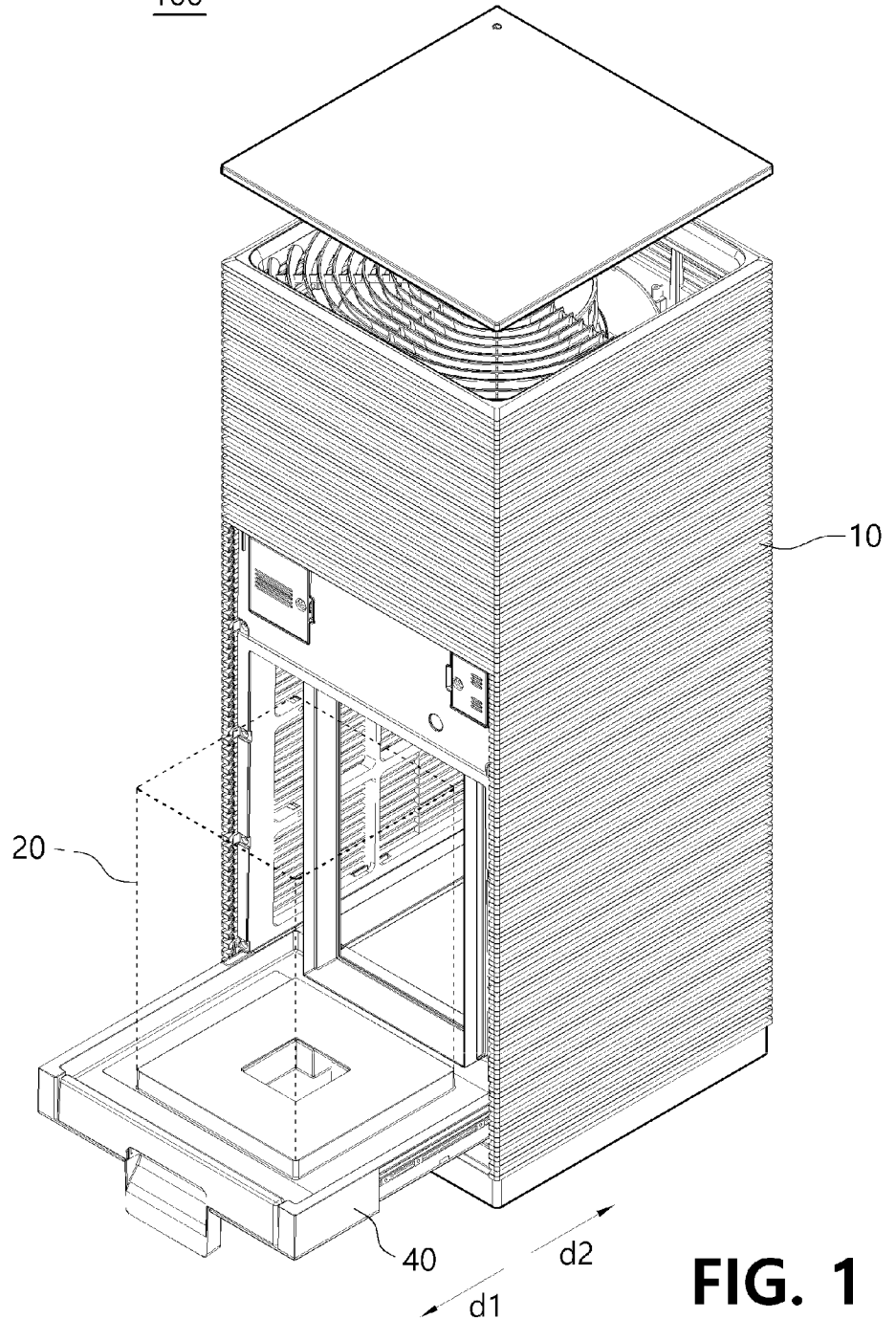
FIG. 1 is a perspective view illustrating a state in which a filter member is exposed to an outside of a housing in an air purifier according to an embodiment of the present disclosure.

The words and terms used in the specification and the claims are not interpreted as limited to ordinary or dictionary meanings, but should be interpreted as meanings and concepts corresponding to the technical idea of the present disclosure according to principles in which the inventor can define terms and concepts in order to describe the invention in the best way.

Therefore, the embodiments and components shown in the drawings described herein correspond to preferred embodiments of the present disclosure, and do not represent all technical ideas of the present disclosure, and thus the corresponding components may have various equivalents and modifications to replace them at the time of filing the present disclosure.

It should be understood that the terms 'include' or 'have' used herein are used to describe the presence of stated features, numbers, steps, operations, elements, components, or combinations thereof, but do not preclude the presence or addition of one or more other features, numbers, steps, operations, elements, components, or combinations thereof.

It will be understood that any component is located in the 'front', 'rear', 'upper' or 'lower' of another component, unless otherwise specified, includes those located in the 'front', 'rear', 'upper' or 'lower' immediately adjacent to the other component, as well as where another component is located in the middle. Further, a component being 'connected' to another component includes not only a direct connection to each other but also a case of indirect connection to each other unless otherwise specified.

Figure 2:
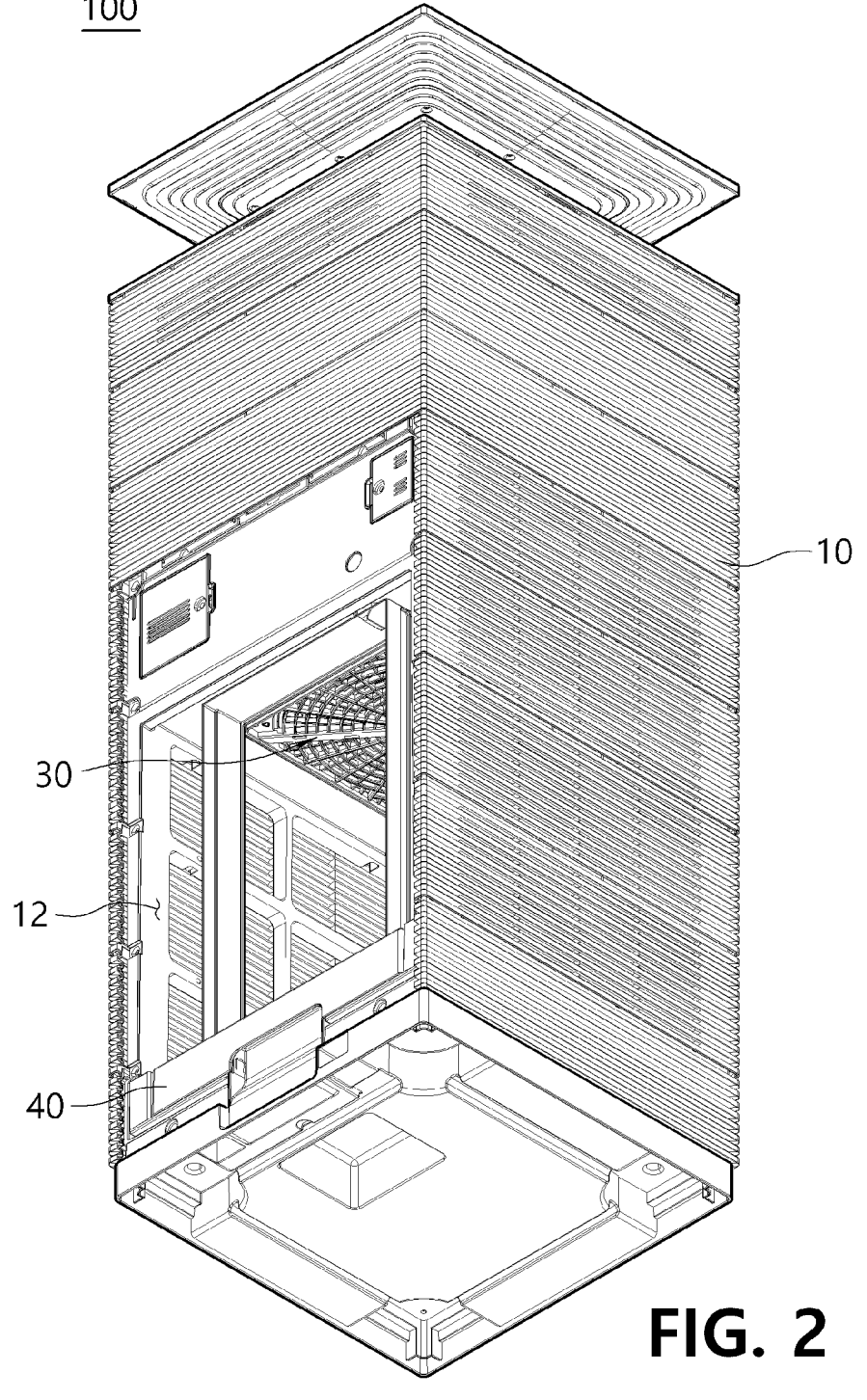
FIG. 2 is a perspective view illustrating an air purifier according to an embodiment of the present disclosure, which is viewed from a lower side to an upper side.
Figure 3:
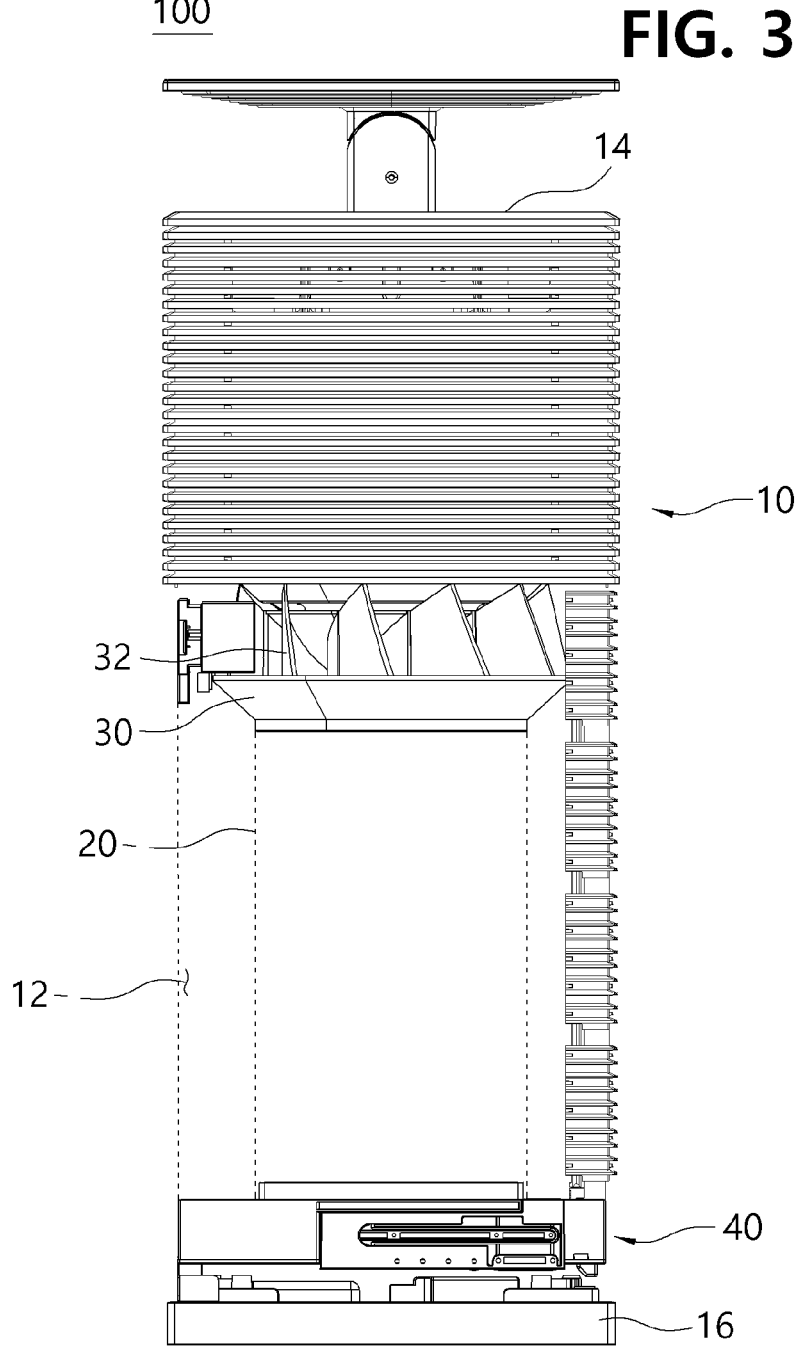
FIG. 3 is a side view illustrating a lock position state of an air purifier according to an embodiment of the present disclosure.
Figure 4:
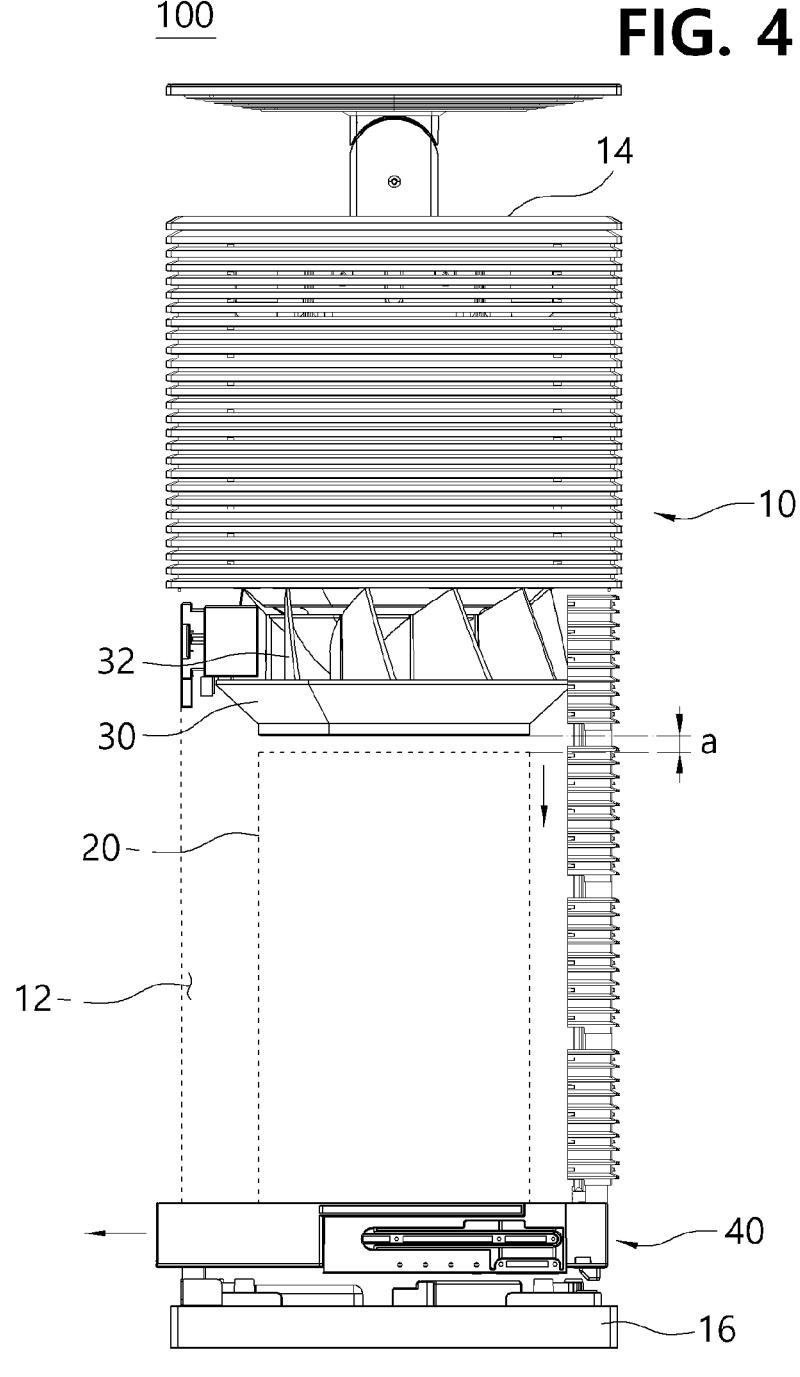
FIG. 4 is a side view illustrating a release position state of an air purifier according to an embodiment of the present disclosure.
Figure 5:
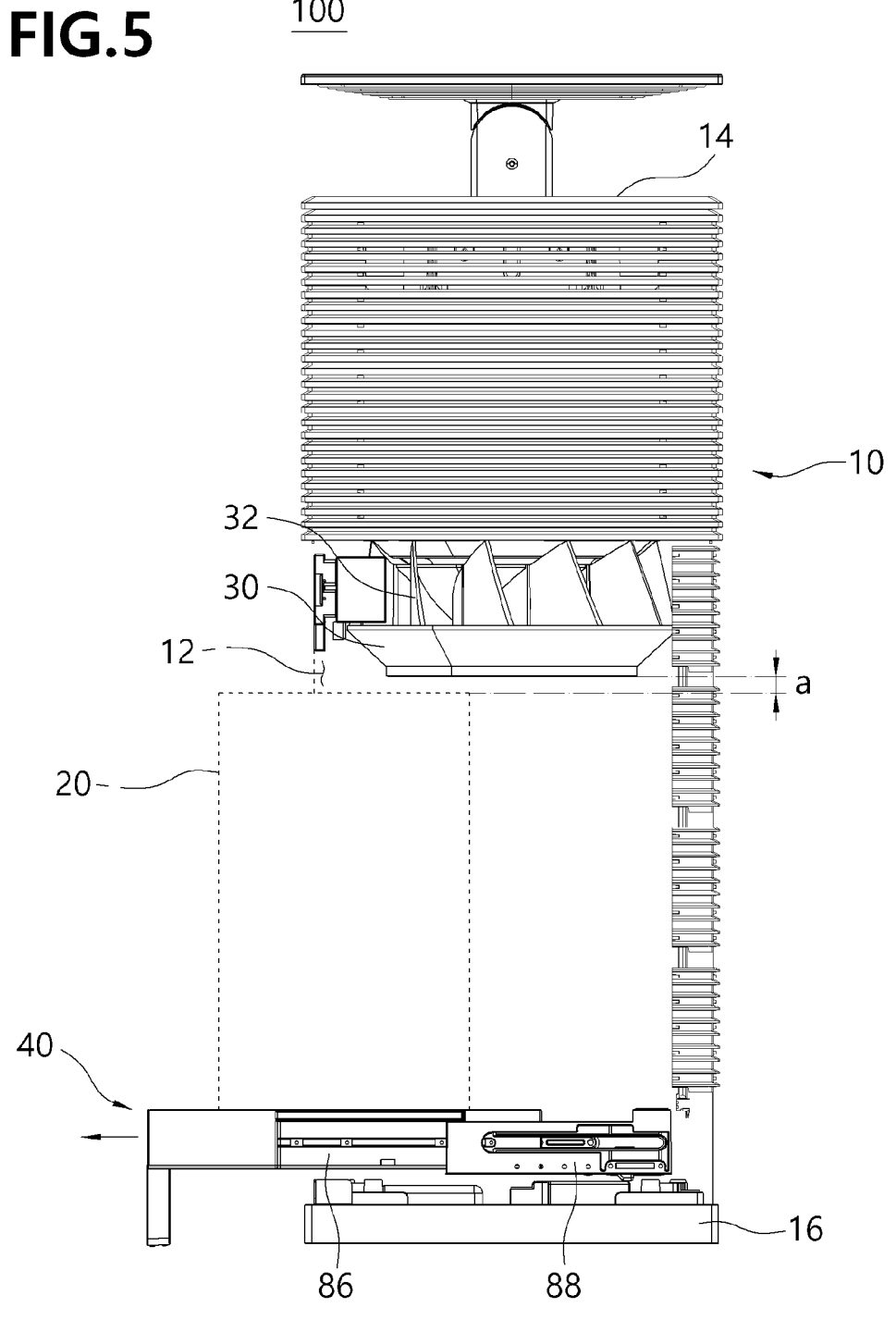
FIG. 5 is a side view illustrating a state in which a filter member is exposed to an outside of a housing in a release position of an air purifier according to an embodiment of the present disclosure.

Hereinafter, an air purifier according to an embodiment of the present disclosure will be described with reference to the drawings. FIG. 1 is a perspective view illustrating a state in which a filter member is exposed to an outside of a housing in an air purifier according to an embodiment of the present disclosure, and FIG. 2 is a perspective view illustrating an air purifier according to an embodiment of the present disclosure, which is viewed from a lower side to an upper side. FIG. 3 is a side view illustrating a lock position state of an air purifier according to an embodiment of the present disclosure, FIG. 4 is a side view illustrating a release position state of an air purifier according to an embodiment of the present disclosure, and FIG. 5 is a side view illustrating a state in which a filter member is exposed to an outside of a housing in a release position of an air purifier according to an embodiment of the present disclosure. In order to clearly illustrate the present disclosure, parts not related to the description are omitted from the drawings.

The air purifier 100 according to an embodiment of the present disclosure is a device that includes a blowing fan 32 and a filter member 20 to suck and purify polluted air and then discharge the purified air. In particular, the air purifier 100 according to an embodiment of the present disclosure is a device capable of enhancing convenience of replacement and maintenance of the filter member 20 by introducing a unique filter support structure 40. Hereinafter, each configuration of the air purifier 100 according to an embodiment of the present disclosure will be described, and a configuration and effect of the filter support structure 40 will be mainly described.

Referring to FIGS. 1 and 2, the air purifier 100 according to an embodiment of the present disclosure includes a housing 10, a filter member 20 disposed in the housing 10 and filtering external air, a latching part 30 disposed at an upper side of the filter member 20 in the housing 10, and a filter support structure 40 on which the filter member is mounted, and which can be withdrawn of the housing.

First, the housing 10 forms the exterior of the air purifier 100, and may be formed in a box shape to have a space for arranging each component therein. At this time, as shown in FIG. 1, the housing 10 may be formed in a rectangular parallelized shape, or may be formed in a cylindrical shape, although not shown in the drawings. However, the shape of the housing 10 is not limited thereto, and various shapes of housings having a space formed therein may be applied.

In one embodiment of the present disclosure, referring to FIG. 2, a plurality of intake holes 13 penetrating at least a portion of the housing 10 may be provided on an outer surface of the housing 10 so that external air may be sucked into the housing 10. For example, the intake holes 13 may be formed in a shape of a slit extending in one direction or a circular opening, as shown in the drawing. The intake holes 13 may also be evenly distributed along the outer surface of the housing 10 so that the external air can be uniformly sucked in without being biased in a specific direction.

In one embodiment of the present disclosure, the housing 10 may be formed such that at least a portion of one side surface 12 can be opened to expose an inner space to the outside. As a non-limiting example, a portion of the outer surface of the housing 10 may be completely separable from the housing 10, or a portion of the outer surface of the housing 10 may be hinged to the housing 10 and thus may be rotatable about a rotation axis. In this way, forming of the one side 12 of the housing 12 to be opened as described above is for drawing the filter member 20 disposed inside the housing 10 out of the housing 10 by moving the filter support structure 40 to be described later. Detailed descriptions thereof will be given below through descriptions of the filter support structure 40.

Meanwhile, as shown in FIGS. 2 and 3, a latching part 30 may be formed at one side of the inner space of the housing 10. In this case, the latching part 30 may be formed in a plate shape extending in a direction parallel to the ground, and the outer rim of the latching part 30 may be installed to be connected to the inner surface of the housing 10. The inner space of the housing 10 may be divided into an upper space located at the upper side of the latching part 30 and having the blowing fan 32 disposed therein, and a lower space located at the lower side of the latching part 30 and having the filter member 20 disposed therein. In this case, referring to FIG. 2, the latching part 30 includes a plurality of through-holes to communicate the upper space and the lower space of the housing 10, and thus the filtered air may be moved to the upper space of the housing 10 via the filter member 20. The air moved to the upper space of the housing 10 in this way may pass through the blowing fan 32 and finally be discharged to the outside through an outlet 14 formed at the upper portion of the housing 10.

In one embodiment of the present disclosure, the lower portion of the latching part 30 may be in contact with the filter member 20, as shown in FIG. 3. In this case, the portion of the latching part 30 in contact with the filter member 20 may be formed in a shape corresponding to an upper end of the filter member 20 so that the filter member 20 may be fixed to the latching part 30. For example, a portion of the latching part 30 may be formed to surround an outer edge of the upper end of the filter member 20. Through this, when the filter member 20 is lifted by the filter support structure 40 to be described later and comes into contact with the latching part 30, the filter member 20 may be stably fixed by the latching part 30, and as a result, some of the filtered air discharged from the filter member 20 may not flow out in the lateral direction of the filter member 20. That is, air flow between the filter member 20 and the latching part 30 may be blocked by the latching part 30 to improve the airtightness between the filter member 20 and the latching part 30. Hereinafter, a position at which the filter member 20 is fixed in contact with the latching part 30 is defined as a 'lock position'.

In one embodiment of the present disclosure, the filter member 20 disposed at a lower side of the latching part 30 may be a known filter member. As a non-limiting example, the filter member 20 may be formed of a dust collecting filter such as an ultra-low penetration air (ULPA) filter, a high efficiency particulate air (HEPA) filter, a medium filter, a prefilter for collecting and filtering ultrafine dust of 0.1 to 0.3 μm or fine dust of 0.3 μm or more contained in the air or an antimicrobial filter for filtering bacteria or microorganisms included in the sucked air. In addition, the filter member 20 may be formed to partially separate only some of the above-described components of the filter member. Further, although the filter member 20 having a rectangular pillar shape is shown in the drawings, the shape of the filter member 20 is not limited thereto, and various shapes of filter members may be applied, including a cylindrical filter member and the like.

Meanwhile, as shown in FIG. 3, the filter member 20 may be in the lock position in a state in which the filter member 20 is moved upward by the filter support structure 40 toward the latching part 30 to be described later and thus fixed by contacting the latching part 30, or may be in the release position in a state in which the filter member 20 is moved downward by the filter support structure 40 in the direction of the ground to be spaced apart from the latching part 30 by a predetermined distance (a) as shown in FIG. 4. In particular, in the release position, the airtight state between the latching part 30 and the filter member 20 formed in the lock position may be released.

Figure 6:
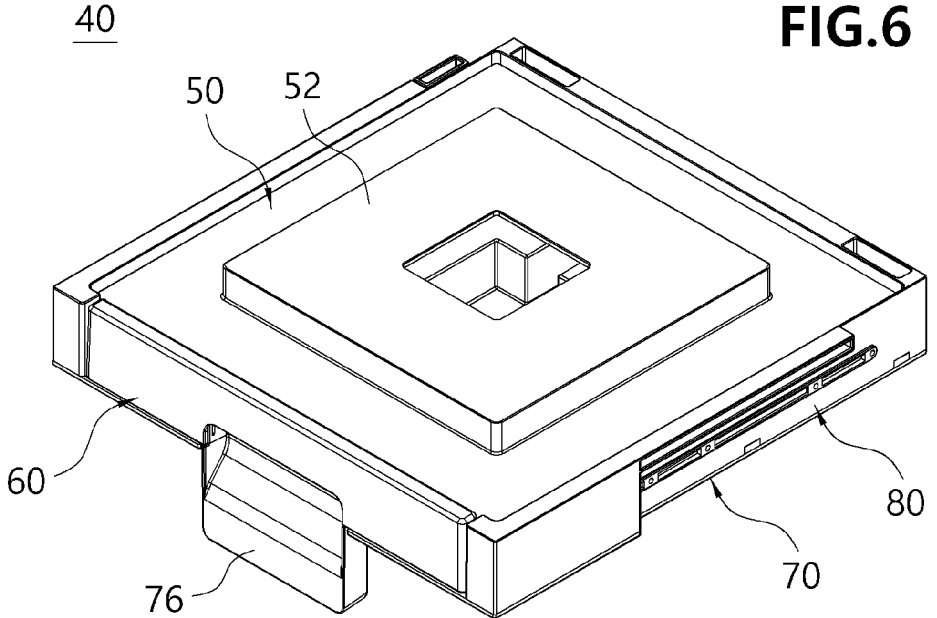
FIG. 6 is a perspective view illustrating a filter support structure of an air purifier according to an embodiment of the present disclosure.
Figure 7:
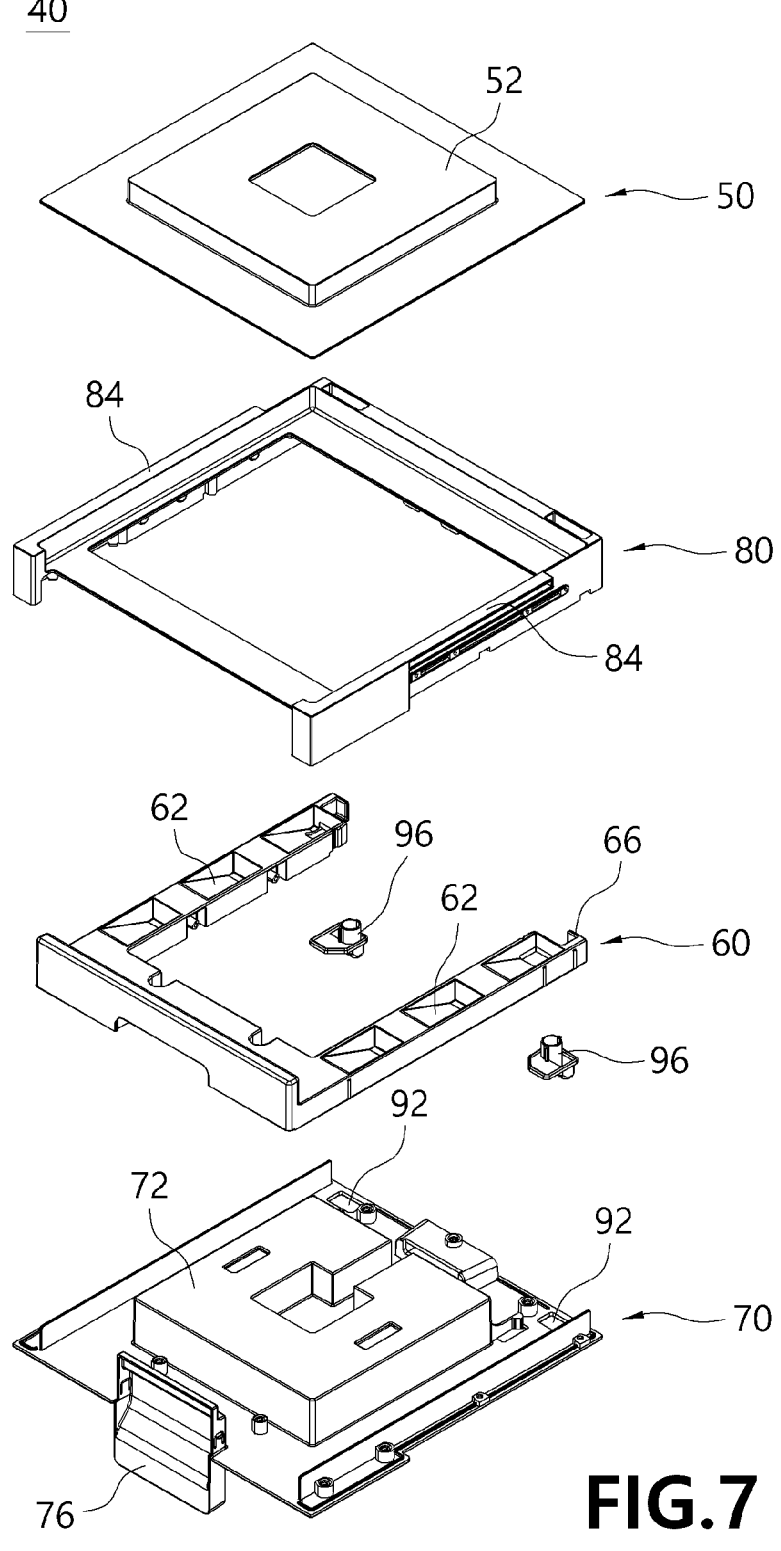
FIGS. 7 and 8 are exploded perspective views illustrating a filter support structure of FIG. 6 separately.
Figure 8:
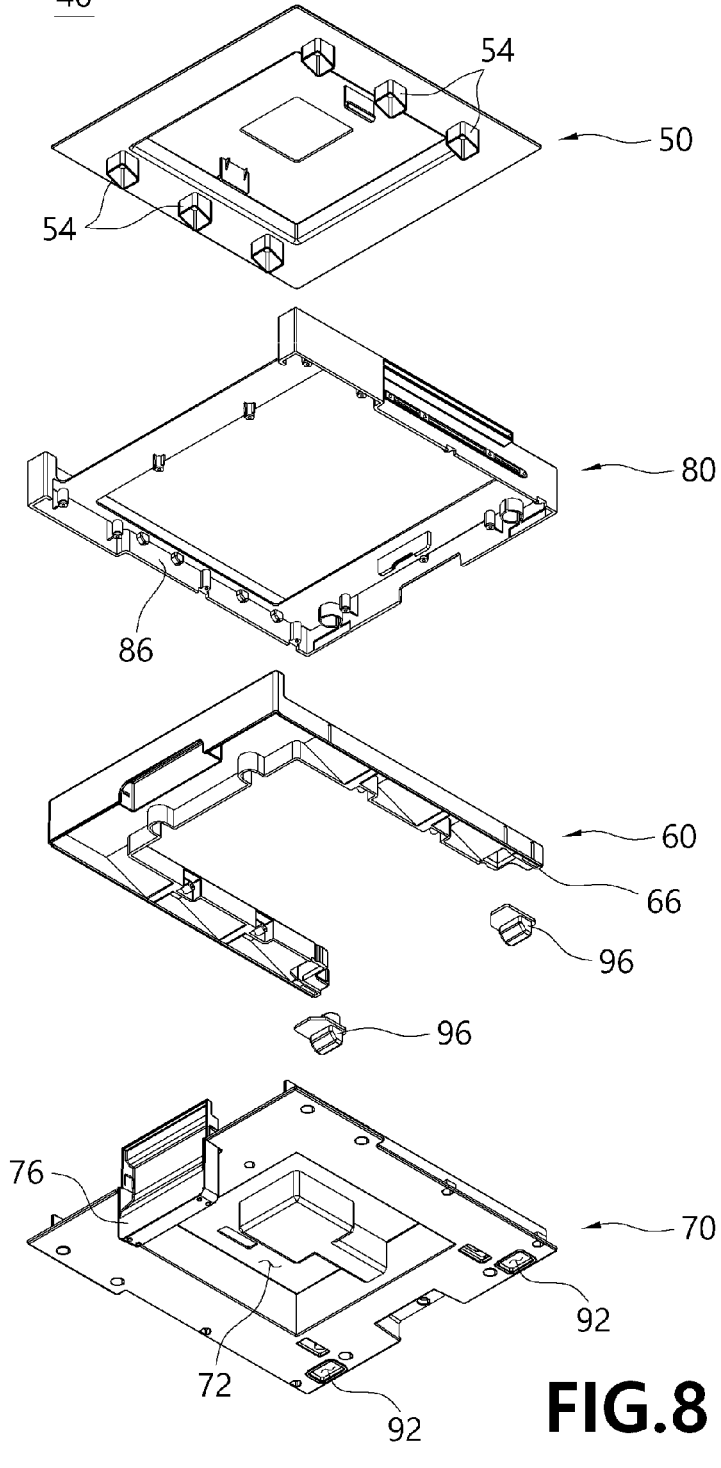
Figure 9:
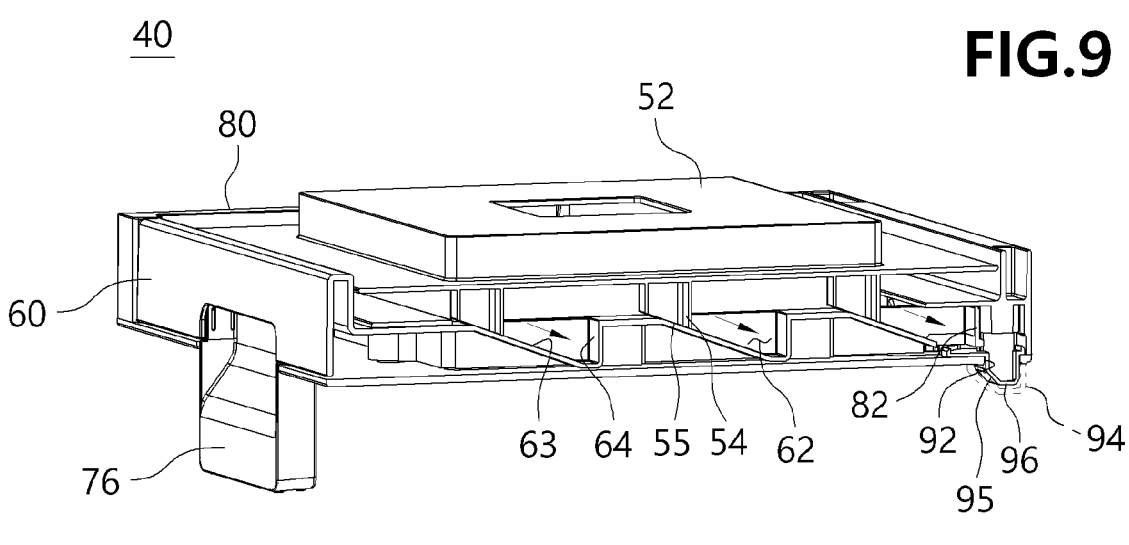
FIG. 9 is a cross-sectional perspective view illustrating a filter support structure in a lock position.
Figure 10:
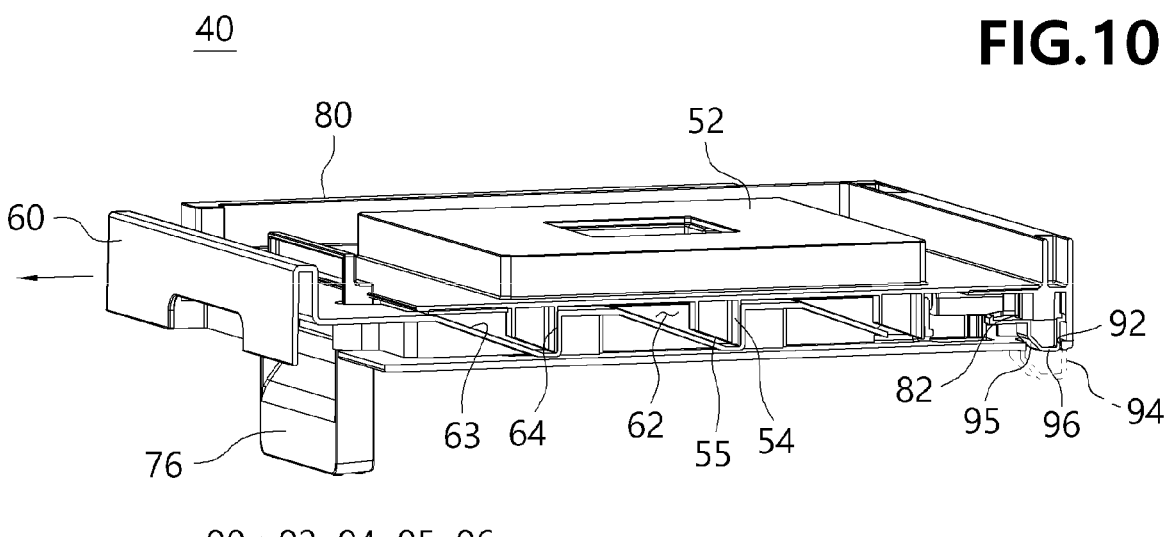
FIG. 10 is a cross-sectional perspective view illustrating a filter support structure in a release position.
Figure 11:
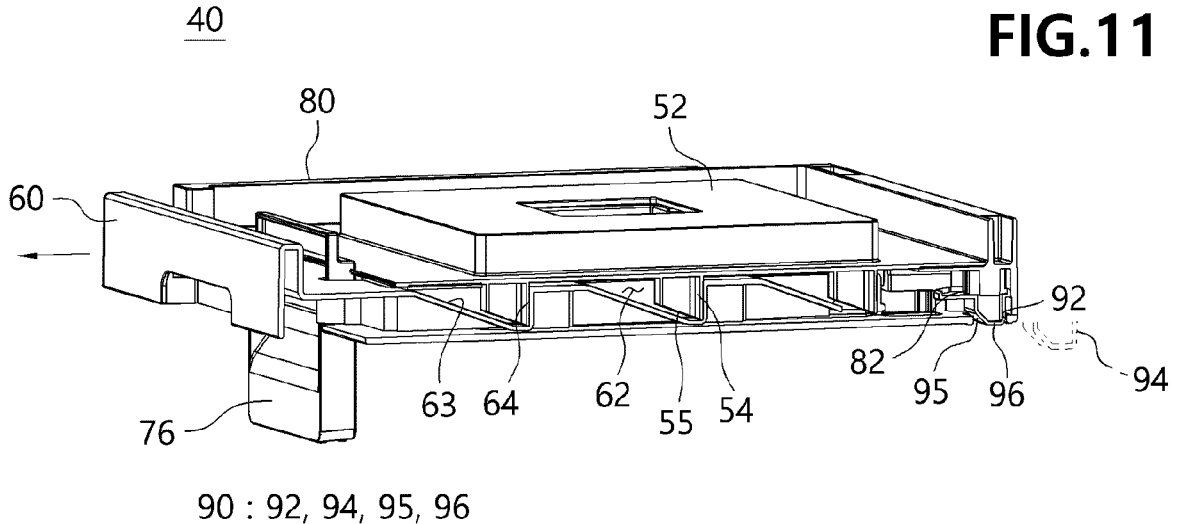
FIG. 11 is a cross-sectional perspective view illustrating a filter support structure in a state in which a portion of the filter support structure exposed to the outside of the housing is exposed.
Figure 12:
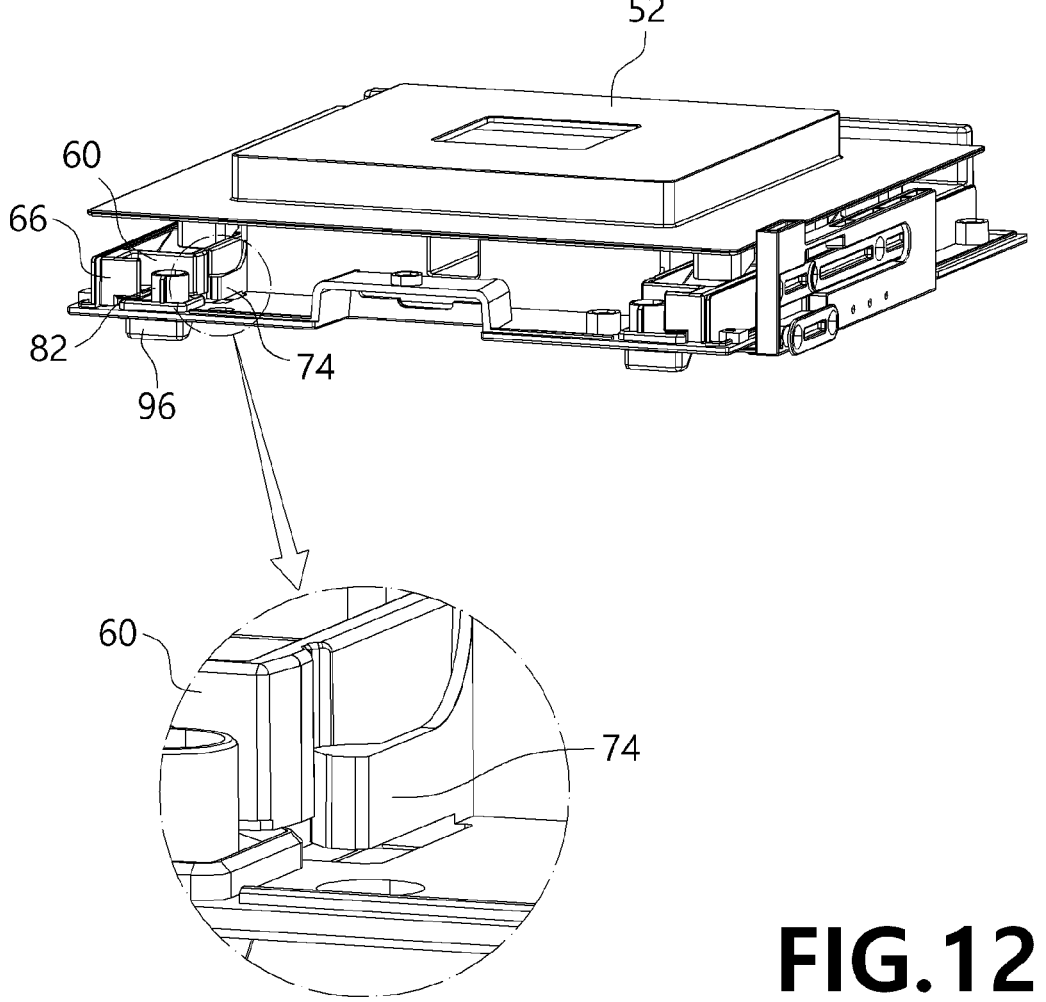
FIG. 12 is a perspective view illustrating a filter support structure in a lock position, which is viewed from a rear side.
Figure 13:
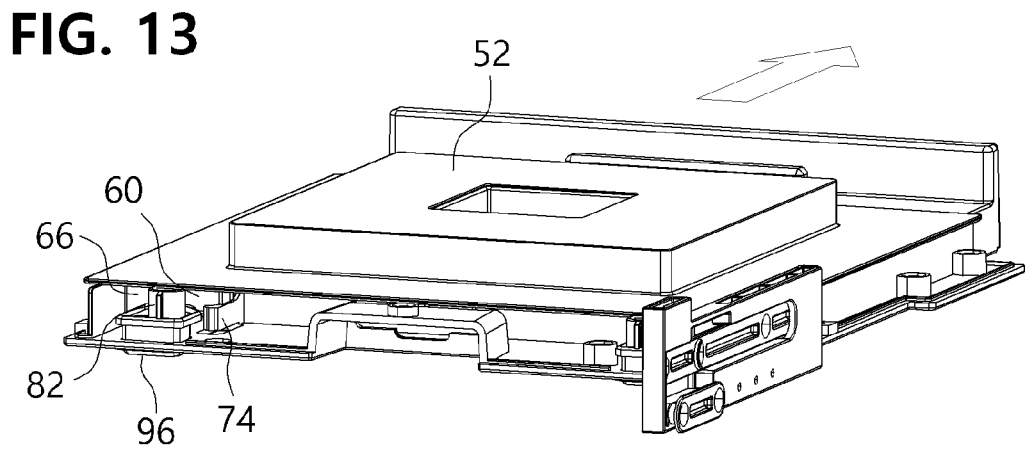
FIG. 13 is a perspective view illustrating a filter support structure in a release position, which is viewed from a rear side.

FIG. 6 is a perspective view illustrating a filter support structure of an air purifier according to an embodiment of the present disclosure, FIGS. 7 and 8 are exploded perspective views illustrating a filter support structure of FIG. 6. FIG. 9 is a cross-sectional perspective view illustrating a filter support structure in a lock position, FIG. 10 is a cross-sectional perspective view illustrating a filter support structure in a release position, FIG. 11 is a cross-sectional perspective view illustrating a filter support structure in a state in which a portion of the filter support structure exposed to the outside of the housing is exposed. FIG. 12 is a perspective view illustrating a filter support structure in a lock position, which is viewed from a rear side, and FIG. 13 is a perspective view illustrating a filter support structure in a release position, which is viewed from a rear side.

The air purifier 100 according to an embodiment of the present disclosure includes a filter support structure 40 supporting a lower portion of the filter member 20. In this case, the filter support structure 40 may be withdrawn out of the housing 10 along a direction of the one side surface 12 while the one side surface 12 of the housing 10 is opened. That is, when it is necessary to separate the filter member 20 to the outside of the housing 10 for reasons such as replacement and maintenance of the filter member 20, the filter support structure 40 may be withdrawn out of the housing 10 by an external force of the user. In this regard, a direction in which the filter support structure 40 is withdrawn out of the housing 10 is defined as a pull-out direction (d1)' based on FIG. 1, and conversely, a direction in which the filter support structure 40 is drawn into the inner space of the housing 10 is defined as a pull-in direction (d2)'.

In more detail, referring to FIGS. 6 to 8, the filter support structure 40 may include a first body 50 and a second body 60.

The first body 50 may be formed in a plate shape having an area corresponding to an inner space of the housing 10. At this time, a mounting part 52 on which the filter member 20 is seated may be formed at the central of the first body 50, and an edge part 51 may be provided around an outer circumference of the mounting part 52. In this case, as shown in FIG. 6, the mounting part 52 may be formed to protrude from the edge part 51 toward the filter member 20 at a predetermined height. As a specific example, the mounting part 52 may have a protruding structure having a circular shape or a rectangular shape to correspond to the shape of the filter member 20. As described above, the mounting part 52 may protrude toward the filter member 20, and thus may be coupled to the filter member 20 in a form such that the mounting part 52 is fitted into a fitting part (not shown) formed in a shape corresponding to the mounting part 52 on the lower surface of the filter member 20. Accordingly, the filter support structure 40 may stably support the filter member 20 so that the filter member 20 is not tilted or falling toward one side when the filter member 20 is drawn out or drawn in. Meanwhile, a space may be formed inside the mounting part 52 so that the coupling part 72 of the third body 70 to be described later may be coupled thereto. This will be described later through description related to the coupling part 72.

Also, the first body 50 may include a protruding part 54 that protrudes and extends in a direction of the ground on a lower surface thereof. In this case, the extension length of the protruding part 54 may be the same as the separation distance (a) between the filter member 20 and the latching part 30 when the filter member 20 is in the release position. In addition, the protruding part 54 may include a plurality of protruding parts 54 that are spaced apart from each other along an area corresponding to the edge part 51 and have the same height.

In one embodiment of the present disclosure, the second body 60 may be disposed at a lower portion of the first body 50. At this time, a groove part 62 having a space to accommodate the protruding part 54 may be formed at a position corresponding to the protruding part 54 of the first body 50. Further, the groove part 62 may have a first inclined surface 63 formed in a straight line or a curved line, in contact with the protruding part 54 of the first body 50. Through this, when the protruding part 54 is supported by the first inclined surface 63 and moves forward or backward in the pull-out direction (d1) or the pull-in direction (d2) along the first inclined surface 63, the first body 50 may be lifted in the latching part 30 or lowered in the direction of the ground.

As a specific example, the second body 60 may be formed in a ' ⊂ ' shape as shown in FIG. 7. The reason why the second body 60 is formed in a ' ⊂ ' shape is to arrange the coupling part 72 of the third body 70 to be described later to penetrate the second body 60, which will be described later through the description of the third body 70. On the other hand, when the second body 60 is formed in a shape of ' ⊂ ', a plurality of groove parts 62 may be formed at positions corresponding to the plurality of protruding parts 54 of the first body 50 along opposing sides of the ' ⊂ ' shape. As described above, a plurality of protruding parts 54 and groove parts 62 are formed, respectively, so that the load of the first body 50 against the second body 60 may be dispersed, and the stability of the filter member may be further improved when the first body 50 is moved up and down.

Hereinafter, an operation relationship between the first body 50 and the second body 60 will be described in more detail. In the initial lock position in which the filter member 20 is fixed by the latching part 30, the first body 50 may be positioned in a state supported by the uppermost portion of the first inclined surface 63 as shown in FIG. 9. In this state, when the user pulls the second body 60 toward the pull-out direction (d1), the first inclined surface 63 moves toward the pull-out direction (d1) as a whole, and accordingly, as shown in FIG. 10, the protruding part 54 of the first body 50 in contact with the first inclined surface 63 moves to a position adjacent to the lowermost portion of the first inclined surface 63 along the first inclined surface 63. As a result, the first body 50 descends a predetermined distance (a) in the direction of the ground to move to the release position where the filter member 20 can be detached, and the filter member 20 fixed to the mounting part 52 of the first body 50 also moves downward together. In this case, the first body 50 may only move in a vertical direction (i.e., the direction perpendicular to the ground) without moving in a horizontal direction (i.e., the pull-out direction or the pull-in direction). Thereafter, when the second body 60 is further withdrawn in the pull-out direction (d1), the first body 50 and the second body 60 may be moved integrally and exposed to the outside of the housing 10, as illustrated in FIG. 11.

On the contrary, when the first body 50 is maintained in a stopped state without moving while being in the release position as shown in FIG. 10, when the second body 60 is inserted in the pull-in direction (d2) opposite to the pull-out direction (d1), the second body 60 moves relative to the first body 50, and the protruding part 54 rises along the first inclined surface 63 of the groove part 62. Accordingly, the entire first body 50 may be raised in the direction of the latching part 30, and thus the filter member 20 may be moved to the lock position in which the filter member 20 is fixed in contact with the latching part 30.

As described above, the air purifier 100 according to an embodiment of the present disclosure introduces the filter support structure 40 including the first body 50 having the protruding part and the second body 60 having the groove part 62 formed at one side of the inclined surface in contact with the protruding part, thereby allowing the filter member 20 drawn out of the housing to be inserted into the housing internal space and simultaneously moving the filter member 20 upward to form a sealing against the latching part 30, thereby improving convenience of user management of the filter. That is, since the inlet and sealing of the filter member are performed in a series of continuous operations, the user may move the filter member 20 upward toward the latching part 30 while allowing the filter member 20 to be inserted into the housing 10 only in a single operation.

In one embodiment of the present disclosure, as shown in FIG. 9, the groove part 62 may include an engaging surface 64 having a shape of being upright in a vertical direction other than the first inclined surface 63 in contact with the protruding part 54. In this case, the first inclined surface 63 may be formed on the pull-out direction (d1) side of the groove part 62 and the engaging surface 64 may be formed on the pull-in direction (d2). Through this, when the protruding part 54 contacts the engaging surface 64 in the release position, the relative movement in the pull-in direction (d2) may be restricted by the engaging surface 64. As a result, when the second body 60 is drawn out in the pull-out direction (d1), one side portion of the protruding part 54 may receive a force from the engaging surface 64, and the first body 50 may also be withdrawn together with the second body 60. In other words, the first body 50 may move only in a direction of the ground while restricting movement in the pull-out direction (d1) from the lock position until the protruding part 54 is in contact with the engaging surface 64, but when the protruding part 54 and the engaging surface 64 are in contact with each other, the first body 50 may receive a force from the engaging surface 64 and move in the pull-out direction (d1) together with the second body 60 (move the filter member 20 from the lock position to the release position). Through this, the user may continuously perform control for lifting and withdrawing the filter member 20 out of the housing without distinguishing from each other, thereby improving the convenience of the user's operation.

Meanwhile, as shown in FIG. 9, the protruding part 54 of the first body 50 may include a second inclined surface 55 having a predetermined angle at an end thereof. In this case, the second inclined surface 55 may have an inclined portion corresponding to the first inclined surface 63 formed in the groove part 62 of the second body 60. Accordingly, when the first body 50 is moved upward or downward by the second body 60, the first body 50 may be moved more stably, thereby improving the stability of the filter member 20 disposed on the first body 50. However, the protruding part 54 having the second inclined surface 55 is only an example, and a protruding part 54 having a shape without the first inclined surface 63 may be applied as necessary.

The filter support structure 40 of the air purifier 100 according to an embodiment of the present disclosure may include a third body 70 disposed at a lower portion of the second body 60 and supporting the second body 60.

Specifically, referring to FIG. 7. the third body 70 may include a coupling part 72 coupled to the mounting part 52 of the first body 50 described above. That is, when the filter member 20 is in the lock position, the first body 50 is positioned in a lifted state in the direction of the latching part 30, and the first body 50 is lowered by the withdrawal of the second body 60, the mounting part 52 of the first body 50 may be coupled to the coupling part 72 of the third body 70. As described above, the first body 50 may be coupled to the third body 70 to move only or mainly in a direction perpendicular to the ground without being moved toward the pull-out direction (d1) or the pull-in direction (d2) when the first body 50 is lowered. After the first body 50 is completely lowered, as described above, the protruding part 54 contacts the engaging surface 64 and receives force from the latching part 30 through the protruding part 54 and moves in the pull-out direction (d1), and the third body 70 coupled with the first body 50 may also be withdrawn together with the second body 60 like the first body 50. When the first body 50 is moved up/down or the pull-out/pull-in direction through the third body 70, the first body 50 may be more effectively supported, and thus the stability of the filter member 20 located at the upper side thereof may be further improved.

In one embodiment of the present disclosure, the coupling part of the third body 70 may be formed in a shape corresponding to the mounting part 52 of the first body 50. As an example, when the mounting part 52 of the first body 50 is formed in a rectangular shape, the coupling part 72 may be formed in a rectangular shape that is smaller than the mounting part 52 and may be coupled to each other in a form inserted into a space formed inside the mounting part 52. Through this, the mounting part 52 of the first body 50 performs a function of seating the filter member 20 and may be coupled to the coupling part 72 of the third body 70 as a shape itself, so that stable coupling force may be obtained without a separate coupling means.

In this case, the second body 60 may be formed in a ' ⊂ ' shape as described above. In this case, as shown in FIG. 9, the coupling part 72 of the third body 70 may be disposed in the second body 60 formed in the ' ⊂ ' shape, and the uppermost portion of the coupling part 72 may be positioned above the second body 60 as the coupling part 72 of the third body 70 passes through the second body 60. Accordingly, when the first body 50 is in the lock position and then descends in the direction of the ground by the withdrawal of the second body 60 (when the third body 70 is moved to the release position), the coupling part of the third body 70 may be inserted into the mounting part 52 of the first body 50 to couple the mounting part 52 and the coupling part 72 to each other. As such, the air purifier 100 according to an embodiment of the present disclosure may facilitate coupling between the first body 50 and the third body 70 through the second body 60 having the ' ⊂ ' shape and the coupling part 72 passing through the second body 60.

Meanwhile, referring to FIG. 12, a pressing stopper 74 for temporarily pressing a portion of the second body 60 may be provided on one side of the third body 70. In this case, the pressing stopper 74 may be formed of a material having an elastic force to press a position corresponding to a groove formed on one side of the second body 60 in a lateral direction. At this time, the second body 60 is pressurized by the pressing stopper 74 to limit the free movement of the second body 60, thereby allowing the second body 60 to be withdrawn only when a desired external force is applied by the user in the lock position. That is, for example, when the air purifier 100 is tilted toward the one side surface 12 of the housing for unavoidable reasons in the lock position, if there is no member such as the above-described pressing stopper 74, the second body 60 may be withdrawn in the pull-out direction (d1) by gravity, and accordingly, the first body 50 may be lowered to the release position. The pressing stopper 74 may prevent the filter member 20 from being moved in a vertical direction unexpectedly, as described above.

Referring to FIGS. 6 to 8, the third body 70 may have a support part 76 formed to protrude from one side thereof in the direction of the ground. In this case, the support part 76 may be formed at a position adjacent to a portion that the user grips to withdraw the second body 60. When the filter support structure 40 is drawn out of the housing 10, the support part 76 may directly contact the ground to support the load of the filter support structure. As such, the support part 76 may be provided so that the filter support structure 40 may not be positioned in a state of being floating in the air, but may disperse the load through the ground, even if the filter support structure 40 is withdrawn out of the housing 10, and as a result, it is possible to prevent an accident in which the filter support structure 40 is completely separated from the air purifier 100 or a portion of the filter support structure 40 is damaged due to the load of the filter member 20.

In one embodiment of the present disclosure, the filter support structure 40 may include a locking part 90 that temporarily restricts relative movement of the second body 60 with respect to the first body 50 before the filter support structure 40 is fully inserted into the housing 10.

As described above, when the second body 60 moves relative to the first body 50, the first body 50 may be lowered from the lock position to the release position or may be lifted from the release position to the lock position by the second body 60. That is, in a state in which the first body 50 does not move in the horizontal direction (the pull-out direction or the pull-in direction) and only when the second body 60 moves in the pull-out direction or the pull-in direction (relative movement with respect to the first body), the first body 50 may move up or down in a direction perpendicular to the ground. However, when the third body 70 coupled to the first body 50 is positioned outside the housing 10, if the relative movement of the second body 60 occurs, the filter member 20 moves upward to the lock position in the state of being positioned outside the housing 10. The locking part 90 may temporarily limit the relative movement of the second body 60 when the third body 70 is positioned outside the housing 10 in order to prevent the filter member 20 from being lifted and lowered in the unexpected position.

As a specific example, referring to FIG. 10, the locking part may include a locking opening 92, a locking groove 94, and an elastic stopper 96. First, the locking opening 92 may be an opening formed on a lower surface of the third body 70 and having an area corresponding to the elastic stopper 96. Further, the locking groove 94 is a groove structure formed in the base part 16 of the inside of the housing 10, and may be formed at a position opposite to the locking opening 92 described above when the third body 70 is completely inserted into the inside of the housing 10 as shown in FIG. 10, and may have an inner space corresponding to the volume of the elastic stopper 96. Next, the elastic stopper 96 may have a compression spring embedded therein to protrude toward the lower side of the third body 70 through the locking opening 92, and if the elastic stopper 96 is positioned above the locking groove 94 formed in the base part 16 of the housing, as shown in FIG. 12, the elastic stopper 96 may be lowered toward the locking groove 94 to fix the third body 70 not to be moved in the pull-out direction (d1) or the pull-in direction (d2). When the elastic stopper 96 is positioned at a position other than the locking groove 94 as shown in FIG. 11 (when the third body 70 is drawn out in the pull-out direction (d1)), the spring is compressed by the base part 16 of the housing 10, and thus the elastic stopper 96 may leave the locking groove 94 and moved upward toward the latching part 30. As a result, the third body 70 is not fixed to the housing 10 and may be moved toward the pull-out direction (d1) or the pull-in direction (d2). In this way, when the elastic stopper 96 is lifted in the direction of the latching part 30, the movement of one end 66 of the second body 60 in the pull-in direction (d2) may be limited by the lifted elastic stopper 96, and as a result, the relative movement of the second body 60 may be restricted with respect to the first body 50. (See FIG. 13) after that, only when the third body 70 is fully inserted into the housing 10 and the elastic stopper 96 is lowered toward the locking groove 94 while being positioned above the locking groove 94, the second body 60 may move in the pull-in direction (d2). Accordingly, the second body 60 may move relative to the first body 50 only at a predetermined position (when the third body 70 is fully inserted into the housing 10).

At this time, a third inclined surface 95 may be formed in a portion of the locking groove 94 in the pull-out direction (d1) as illustrated in FIGS. 10 and 11. Accordingly, when the third body 70 is moved, the elastic stopper 96 may smoothly rise in the direction of the latching part 30 without stopping by the locking groove 94.

In one embodiment of the present disclosure, the filter support structure 40 may further include a fourth body 80. Referring to FIGS. 7 to 9, the fourth body 80 may be coupled to the third body 70 to move integrally with the third body 70. Also, the second body 60 may be disposed between the third body 70 and the fourth body 80, and a portion of the handle side of the second body 60 may be covered by the fourth body 80. As a result, when the second body 60 partially covered by the fourth body 80 is moved in the pull-out direction (d1) or the pull-in direction (d2), it may be prevented from being lifted in the direction of the latching part 30 by the load of the fourth body 80. The fourth body 80 may have a frame part 84 having a predetermined height on both sides and surrounding the outer edge of the first body 50, thereby stably guiding the ascending or descending of the first body 50. Also, as shown in FIG. 13, a guide part 82 may be provided inside the fourth body 80 to be coupled to the elastic stopper 96 to stably guide the elastic stopper 96 to ascend or descend. In this case, a coupling protrusion or a coupling groove extending in the ascending or descending direction of the elastic stopper may be formed on the outer circumferential surface of the guide part 82, and a coupling groove or a coupling protrusion corresponding to the coupling protrusion or the coupling groove may be formed on the elastic stopper 96. Further, a rail member may be provided on both sides of the fourth body 80, and the rail member interacts with another rail member provided on the inner side of the housing, thereby smoothly guiding the filter support structure 40 without friction when the filter support structure 40 is slid in the pull-out direction (d1) or the pull-in direction (d2).

Although the present disclosure has been described in detail with reference to the accompanying drawings, it is to be understood that the present disclosure is not limited to the embodiments provided herein, and those skilled in the art who understand the present disclosure can easily propose other embodiments by addition, change, delete, adding, etc., within the scope of the same spirit, but the present disclosure is also within the scope of the present disclosure.

What is claimed is:

1. An air purifier comprising:
   a housing having at least a portion of one side surface openable:
   a filter member disposed in the housing and for filtering external air;
   a latching part disposed at an upper side of the filter member in the housing, wherein at least a portion of the latching part have a shape corresponding to an upper end of the filter member and is formed to be in contact with the upper end of the filter member; and
   a filter support structure on which the filter member is seated, and which, in a state where one side surface of the housing is open, can be drawn out of the housing along a pull-out direction in a direction of the one side surface,
   wherein the filter support structure comprises:
   a first body having a mounting part on which the filter member is seated, and having a protruding part protruding and extending in a direction of the ground on a lower surface thereof: and
   a second body disposed at a lower portion of the first body, and having a groove part formed on one side thereof with an inclined surface of a straight line or a curved line in contact with the protruding part,
   wherein the protruding part moves upward along the inclined surface of the groove part when the second body is drawn in a pull-in direction opposite to the pull-out direction, the first body moves from a release position, which is a position where the filter member is detachable, to a lock position, which is position at an upper side of the release position and a position where the filter member is in contact with the latching part and fixed thereto, and
   in the lock position, air flow between the filter member and the latching part is blocked.

2. The air purifier of claim 1, wherein an inclined portion corresponding to the inclined surface of the groove part is formed on one side of the protruding part.

3. The air purifier of claim 1, wherein the second body is formed in a shape of ' ⊂ ', the groove part is formed in plurality along opposite sides of the ' ⊂ ', and
   the protruding part of the first body is formed in plurality to correspond to the plurality of groove parts.

4. The air purifier of claim 1, wherein the filter support structure comprises:
   a third body of which at least a portion is disposed at a lower portion of the second body to support the second body,
   wherein the second body is formed in a shape of ' ⊂ ',
   the third body has a coupling part coupled to the mounting part, and
   the coupling part passes through the second body when the coupling part is coupled to the mounting part and is positioned above the second body.

5. The air purifier of claim 1, wherein when the second body is withdrawn in the pull-out direction, the protruding part moves downward along the inclined surface of the groove part, and the first body moves from the lock position to the release position.

6. The air purifier of claim 5, wherein the inclined surface of the second body is formed on the pull-out direction side of the groove part, and an engaging surface is formed on the pull-in direction side of the groove part, the protruding part is in contact with the engaging surface to limit movement in the pull-in direction at the release position, and the first body is drawn together with the second body when the second body is withdrawn in the pull-out direction.

7. The air purifier of claim 6, wherein the filter support structure comprises:

a third body of which at least a portion is disposed at a lower portion of the second body to support the second body, wherein the third body has a coupling part coupled to the mounting part, and the third body is drawn together with the second body when the second body is withdrawn in the pull-out direction.

8. The air purifier of claim 7, wherein the mounting part of the first body has a circular or rectangular protruding structure corresponding to a shape of the filter member, and the coupling part of the third body is formed in a shape corresponding to the mounting part.

9. The air purifier of claim 7, wherein a pressing stopper temporarily pressing a portion of the second body is provided at one side of the third body to limit free movement of the second body.

10. The air purifier of claim 7, the third body comprises a support part protruding from one side thereof in the direction of the ground to support a load of the filter support structure in contact with the ground when the filter support structure is withdrawn.

11. The air purifier of claim 7, wherein the filter support structure comprises:

a locking part temporarily limiting a relative movement of the second body before the filter support structure is fully inserted into the housing so that the first body can move upward by the relative movement of the second body only after the third body is fully inserted into the housing when the filter support structure is drawn.

12. The air purifier of claim 11, wherein the locking part comprises:

a locking opening formed on one side of the third body:

a locking groove formed at one side of the inside of the housing and formed at a position opposite to the locking opening when the filter support structure is fully inserted into the housing: and an elastic stopper protruding toward a lower side of the third body through the locking opening and having a spring therein to be lowed toward the locking groove when the elastic stopper is positioned above the locking groove, thereby fixing the third body to the housing, and wherein the elastic stopper is lifted to limit the relative movement of the second body when the elastic stopper is positioned at a position other than the locking groove.

13. The air purifier of claim 12, wherein an inclined surface is formed in one side of the locking groove so that the elastic stopper can be lifted without stopping locked when the third body moves.

14. The air purifier of claim 12, wherein the filter support structure further comprises:

a fourth body coupled to the third body to move integrally with the third body and covering at least a portion of the second body, wherein the fourth body comprises a guide part coupled to the elastic stopper at one side thereof to guide the elastic stopper to ascend or descend.

15. The air purifier of claim 14, wherein the fourth body comprises a frame part surrounding at least a portion of an outer rim of the first body.

\* \* \* \* \*